Feb. 17, 1970  D. H. McCLURE  3,495,553
CART

Filed July 1, 1968  2 Sheets-Sheet 1

Delmar H. McClure
INVENTOR
BY Kolisch + Hartwell
Attys.

Feb. 17, 1970   D. H. McCLURE   3,495,553
CART

Filed July 1, 1968   2 Sheets-Sheet 2

Delmar H. McClure
INVENTOR
BY
Kolisch & Hartwell
Attys.

United States Patent Office 3,495,553
Patented Feb. 17, 1970

3,495,553
CART
Delmar H. McClure, 9051 SE. 55th Ave.,
Portland, Oreg. 97206
Filed July 1, 1968, Ser. No. 741,672
Int. Cl. A21c 11/16
U.S. Cl. 108—14          8 Claims

ABSTRACT OF THE DISCLOSURE

A convertible cart formed of reinforced plastic material for transporting laundry and the like. The cart includes a seamless body having a base and three substantially upright walls joined to the base. The cart further includes a pair of removable panels which can be mounted on the body either to form upwardly facing inclined shelves thereon, or to form a fourth wall defining a bin together with the three walls that are integral with the body.

---

This invention pertains to a cart for transporting laundry and the like. More particularly, it pertains to such a cart which may be converted to one configuration wherein it has shelving, and to another configuration where it takes the form of a bin or hopper. While a preferred embodiment of the invention is described in connection with the handling of laundry, this is for the purpose of illustration only, and is not done with any intention to limit other uses of the invention.

In places such as a hospital where a large amount of laundry, both clean and soiled, is handled, a number of problems are encountered, and several factors must be considered if handling is to be satisfactorily performed. To begin with, soiled laundry is not ordinarily stacked and carried in uniform units, but rather is usually collected in a bundle for transport. For efficiency in handling soiled laundry, therefore, it is desirable to utilize something in the form of an open-topped bin or hopper into which irregularly sized bundles may easily be dumped and transported.

Clean laundry, on the other hand, is usually folded and stacked in orderly piles, and preferably is transported on means such as shelving where it is well supported and easily accessible. However, with stacked laundry carried on shelving, care must be taken during transport to prevent the laundry from falling off the edges of the shelving due to jostling that may occur during transport.

It is apparent, therefore, that the two types of laundry mentioned require two different types of carriers for efficient handling. But where a large amount of laundry is involved, as in a hospital, if two completely different sets of carriers must be provided, this can amount to a considerable expense.

Thus, a general object of the present invention is to provide a novel cart for transporting laundry and the like which takes the above-mentioned factors into account in a practical and satisfactory manner.

More specifically, an object of the invention is to provide a novel cart which can easily be converted to one configuration where it includes shelving to transport articles such as stacked clean laundry, and to another configuration where it takes the form of a bin or hopper to carry articles such as bundles of soiled laundry.

Another object of the invention is to provide such a cart wherein the shelving that is employed in the first-mentioned configuration is oriented in such a fashion that it slopes downwardly from an exposed edge toward a back-up wall to prevent articles carried on the shelving from slipping off the edge. Such a construction takes care of the problems resulting from jostling, while at the same time providing good access for articles stored on the shelving.

In order to take full advantage of a convertible cart of the type proposed, certain further factors must be considered. Before a cart which has carried soiled laundry can be employed to transport clean laundry, the cart must be thoroughly washed, if not sterilized. Thus, it should preferably be made of a material which can readily be washed with a relatively high temperature cleaning solution, and which is easily dried. Further, the parts in a cart should be constructed to offer a minimum number of small and hard-to-clean regions where dirt can collect.

Thus, another object of the present invention is to provide a cart having tthe features so far mentioned which takes these additional factors into account.

More particularly, and according to a preferred embodiment of the invention, the proposed cart includes a body, and removable panels adapted to be mounted on the body, each of which are unitary and seamless structures formed from fiberglas-reinforced plastic. With such construction high temperature washing and subsequent complete drying, is easily accomplished. And, because the structures are unitary and seamless, the number of regions where dirt can collect and become lodged is minimized.

Yet another object of the invention is to provide such a cart wherein the conversion thereof from one to the other of the above-mentioned configurations can easily and quickly be accomplished.

These and other objects and advantages attained by the invention will become more fully apparent as the description which follows is read in conjunction with the accompanying drawings, wherein.

Figure 1:
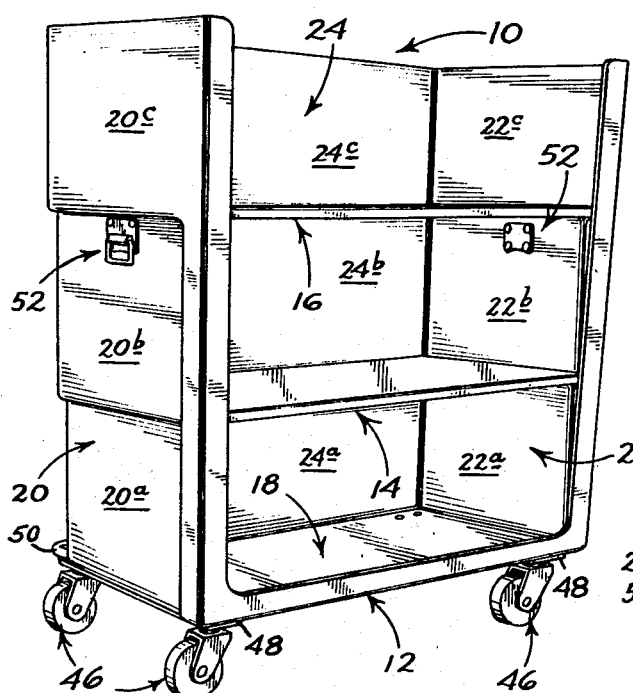
FIG. 1 is a perspective view of a cart constructed according to the invention, with a pair of panels in the cart installed to form shelving.
Figure 3:
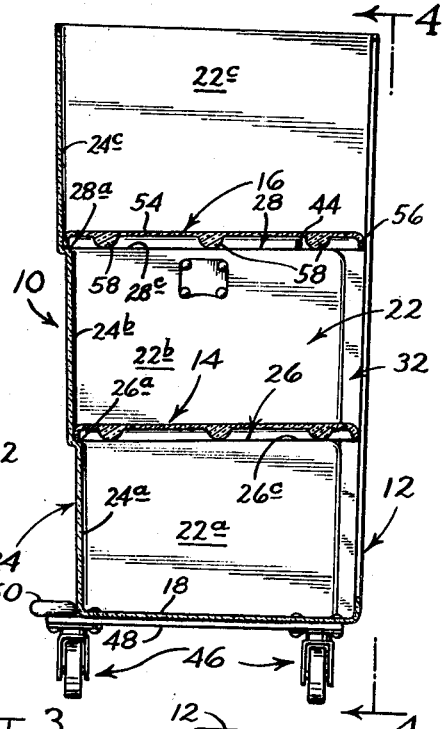
FIG. 3 is a cross-sectional view taken along the line 3—3 in FIG. 2, but with the panels installed as in FIG. 1.
Figure 2:
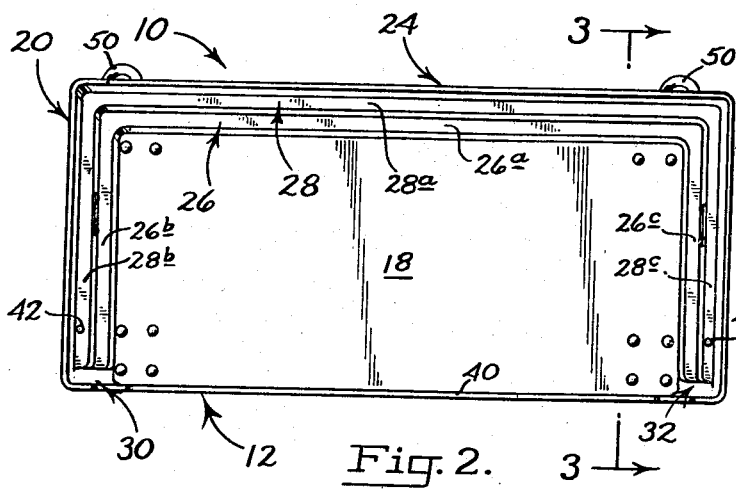
FIG. 2 is an enlarged top plan view of the cart of FIG. 1 with the panels removed.

Turning now to the drawings, and referring first to FIGS. 1 through 3, indicated generally at 10 is a cart constructed according to the present invention. The cart includes a body 12 and a pair of removable panels 14, 16 which are shown removably mounted on the body to form shelves in the cart in FIGS. 1 and 3. In the preferred embodiment shown, the body and panels are constructed from fiberglas-reinforced plastic resin. Formation of the body and panels is accomplished preferably through conventional techniques where a mixture of fiberglas fragments and resin is sprayed onto a mold.

Considering now in greater detail the construction of the cart body, it comprises a unitary and seamless structure including an elongated substantially planar base 18, end walls 20, 22, and a rear wall 24. The end walls extend upwardly from adjacent opposite ends of base 18, and the rear wall extends upwardly from adjacent the rear margin of the base. Wall 24 extends between and joins the end walls.

Walls 20, 22, 24 have somewhat stepped configurations, and progressing upwardly from base 18 include outwardly sloping bottom expanses 20a, 22a, 24a, middle expanses 20b, 22b, 24b, and top expanses 20c, 22c, 24c, respectively. The bottom and middle expanses of the various walls are joined through a continuous substantially U-shaped ledge which extends outwardly from the bottom expanses toward the middle expanses. The middle and top expanses of the walls are joined through a similar ledge 28. Ledges 26, 28 include substantially horizontal medial runs 26a, 28a which extend along the rear wall, and end runs 26b, 28b and 26c, 28c, which extend along walls 20, 22, respectively. The end runs are similar to one another, and as can be seen clearly in FIG. 3 for end runs 26c, 28c, the runs slope downwardly progressing toward rear wall 24 in the body.

As can be seen in FIG. 2, because of the stepped configurations in the walls, the various runs in ledge 28 are disposed outwardly of the corresponding runs in ledge 26. The ledges constitute first support means in the body for supporting panels 14, 16 in the positions in which they are shown in FIGS. 1 and 3.

Figure 4:
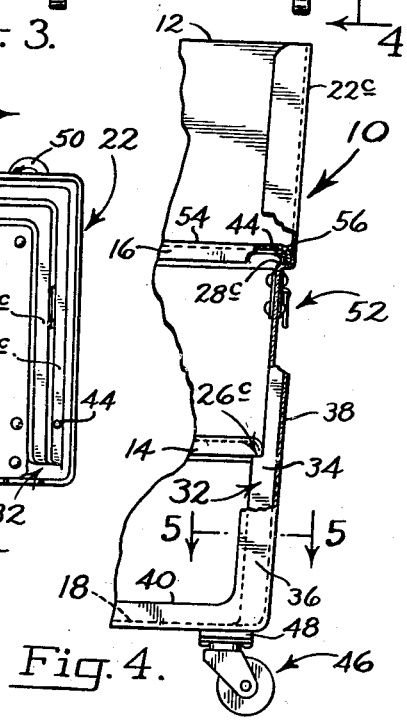
FIG. 4 is a fragmentary view taken along the line 4—4 in FIG. 3, with portions in the cart broken away to illustrate details of construction.
Figure 5:
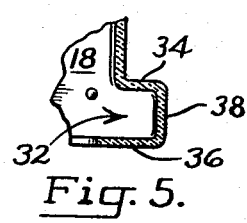
FIG. 5 is an enlarged fragmentary cross-sectional view taken along the line 5—5 in FIG. 4.

Referring now particularly to FIGS. 2 through 5, formed along the front margins of walls 20, 22 are recessed regions 30, 32, respectively, which face one another. These regions are similar, and considering region 32 it is bounded on the rear side by a web 34 which occupies a substantially upright plane, and on the front side by a web 36 spaced from and paralleling web 34. The right side of region 32 in FIGS. 4 and 5 is bounded by a sloped web 38 which extends between and joins webs 34, 36. Web 34 extends upwardly from base 18 to the elevation of ledge run 28c. Webs 36, 38 extend upwardly from the base to the top of side expanse 22c. Web 36 and the corresponding web in wall 20 are joined by an elongated flange 40 which extends along the front edge of base 18, with the flange extending upwardly from the base.

It will be noted that body 12 is formed without sharp corners. Such construction greatly reduces the number of areas where dirt can collect or become lodged.

Mounted on ledge runs 28b, 28c in the body are upwardly projecting pins 42, 44, respectively. As can be seen in FIG. 2, these pins are located adjacent the forward extremities of the runs. The function of the pins will be explained more fully later.

The body of the cart is supported for movement over the ground through conventional swivel casters, or wheel means, 46. The casters are mounted on the bottom side of base 18 through plates 48 which are suitably anchored adjacent opposite ends of the base. Resilient, somewhat doughnut-shaped bumpers 50 are suitably fastened adjacent the rear ends of plates 48, with the bumpers (as can be seen clearly in FIG. 2) projecting rearwardly beyond the rear extremities of body 12. For manipulating the cart, handle assemblies 52 are mounted in the positions shown on wall expanses 20b, 22b.

Previously mentioned panels 14, 16 are similar in construction, except that panel 16 is sized to be supported on ledge 28, and is, therefore, somewhat wider and longer than panel 14 which is sized to be fitted on ledge 26. Thus, and considering panel 16, it constitutes a unitary and continuous seamless structure including a substantially planar rectangular deck 54. Joined to and extending about the periphery of deck 54 is a rim 56 which projects to one side of the deck. Further included in the panel are elongated laterally spaced reinforcing ribs 58 which project from the same side of deck 54 as rim 56.

Explaining now how the cart described herein may be used, as shown in FIGS. 1, 3 and 4, panels 14, 16 may be mounted removably on ledges 26, 28 to form shelves for supporting articles such as stacked pieces of laundry. The panels in such positions are restrained against lateral movement by the walls in the body. Rim 56 in panel 16 seats on ledge runs 28b, 28c outwardly of pins 42, 44, and thus prevents outward movement of walls 20, 22 through engagement with the pins. This is an important feature where a large quantity of articles may be stored on the panels causing considerable outward lateral pressure on the end walls.

Another important feature of the cart is that the sloped end runs in the ledges ensure that the upwardly facing decks in the panels slope downwardly toward rear wall 24. As a consequence, articles stacked on the panels are prevented from working their way outwardly and slipping off the outer edges thereof as a result of jostling during movement of the cart. This feature permits the cart to be used in the configuration shown in FIGS. 1 and 3 with the forward side thereof left open to provide easy access to articles stored on the panels.

Figure 6:
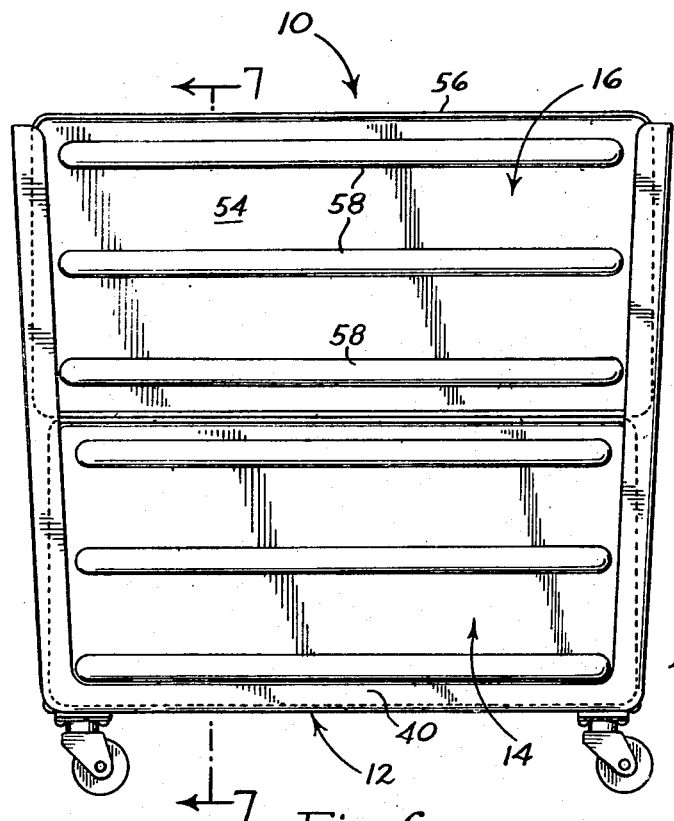
FIG. 6 is a front elevation of the cart with the panels therein installed to form a front wall and FIG. 7 is a cross-sectional view taken along the line 7—7 in FIG. 6.
Figure 7:
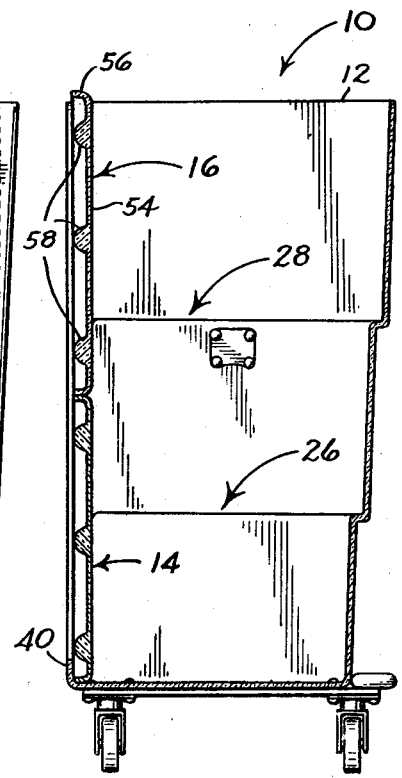

When it is desired to transport articles that are not readily stacked on shelves, but are preferably carried in a bin or hopper-like container, the cart may be converted to have the configuration shown in FIGS. 6 and 7. With the parts in this condition, panels 14, 16 are supported in recessed regions 30, 32 with panel 16 disposed directly above and resting on panel 14. In particular, the panels form a front wall in the cart with their decks occuping a common upright plane substantially paralleling the planes occupied by the webs bounding the front and rear sides of the recessed regions.

With the cart thus converted, bundles of articles, such as bundles of laundry, are easily placed in the space defined by the base, walls and panels in the cart. The webs which define front and rear sides of the recessed regions act as stiffeners for end walls 20, 22 tending to resist outward bending of the walls due to lateral pressure exerted by articles carried in the cart. The recessed regions receiving opposite ends of panels 14, 16, together with flange 40 support the panels in place. Ribs, such as ribs 58, resist outward bending of the panels.

Because of the unitary and seamless construction proposed for the body and panels in the cart, and since the same are constructed from fiberglas-reinforced resin, cleaning the parts is a relatively simple matter. There are few places where germs or dirt can collect, and the parts, after washing, quickly dry. Thus, the cart is a practical unit for transporting both clean and soiled articles.

With the walls of the body constructed as described herein, several advantages are attained. Since the ledges are of slightly different sizes, shelves of slightly different size may be employed, and this simplifies shelf installation and removal. With the wall expanses sloped, the body is readily formed on a mold, and easily removed once formed. Thus, manufacturing is simplified and economy is attained.

While an embodiment of the invention has been shown, it is appreciated that variations and modifications may become apparent to those skilled in the art and may be made.

It is claimed and desired to secure by Letters Patent:

1. A convertible cart for transporting laundry and the like comprising a unitary continuous and seamless body formed from reinforced plastic material including an elongated substantially planar base, a pair of spaced end walls joined to and extending upwardly from adjacent opposite ends of said base, and a rear wall joined to and extending upwardly from adjacent the rear margin of said base and joining said end walls, a continuous and seamless panel formed from substantially the same material as that forming said body adapted to be removably mounted on said body said panel including a substantially planar deck, first support means formed in said body above said base adapted to receive and support said panel in one position on the body, with said panel when in said one position being received within the space bounded by said walls and, being positioned with said deck defining an upwardly facing shelf which slopes downwardly toward said rear wall, and second support means formed in said body adjacent the forward margins of said end walls adapted releasably to receive and support said panel in another position on said body, with said panel when in said other position being oriented with its deck occupying a substantially upright plane spaced forwardly of said rear wall and spanning the space between said end walls.

2. The cart of claim 1, wherein said first support means comprises an elongated continuous ledge including a medial run extending along said rear wall and a pair of end runs joining with said medial run each extending along an end wall.

3. The cart of claim 2, wherein said medial run is substantially horizontal, and said end runs slope upwardly progressing away from said medial run.

4. The cart of claim 3, wherein each of said walls includes a pair of substantially planar expanses disposed one above and one below said ledge, and said expanses slope outwardly progressing upwardly from said base.

5. The cart of claim 2, wherein said second support means comprises a pair of elongated and upright recessed regions formed in said end walls with said regions facing one another.

6. The cart of claim 5, wherein the front and rear sides of each recessed region are bounded by webs included in the end wall containing the region, with such webs occupying spaced planes substantially paralleling said upright planes.

7. The cart of claim 1 which further comprises wheel means mounted on said base supporting said body for movement over the ground.

8. A convertible cart for transporting laundry and the like comprising a unitary continuous and seamless body formed from reinforced plastic material including an elongated substantially planar base, a pair of spaced end walls joined to and extending upwardly from adjacent opposite ends of said base, and a rear wall joined to and extending upwardly from adjacent the rear margin of said base and joining said end walls, a pair of continuous and seamless panels formed from substantially the same material as that forming said body adapted to be removably mounted on said body, one of said panels having outside dimensions which are somewhat larger than the outside dimensions of the other panel, each panel including a substantially planar deck, a pair of vertically spaced ledges formed in said body above said base adapted releasably to receive and support said panels in one set of positions on the body, with the panels when in said one set of positions being oriented with their decks defining upwardly facing shelves which slope downwardly toward said rear wall, the higher of said ledges being sized to support said one panel, and the lower ledge being sized to support the other panel, and a pair of elongated and upright recessed regions formed in said end walls with said regions facing one another adapted releasably to receive and support said panels in another set of positions on said body, with said panels when in said other set of positions being oriented with their decks occupying a common, substantially upright plane spaced forwardly of said rear wall and spanning the space between said end walls, and with said one panel disposed directly above said other panel.

References Cited

UNITED STATES PATENTS

| | | | |
|---|---|---|---|
| 870,835 | 11/1907 | Lowe | 211—150 XR |
| 1,113,818 | 10/1914 | O'Brien | 108—111 |
| 1,167,550 | 1/1916 | Forsyth | 108—111 |
| 1,731,341 | 10/1929 | Lantz | 248—98 |
| 2,484,996 | 10/1949 | Hatch | 211—150 |
| 2,598,800 | 6/1952 | Kopper | 108—14 |
| 3,149,726 | 9/1964 | Magers | 211—134 |
| 3,172,376 | 3/1965 | Harlis | 108—59 |
| 3,168,271 | 2/1965 | Deschenes | 248—129 |

BOBBY R. GAY, Primary Examiner

G. O. FINCH, Assistant Examiner

U.S. Cl. X.R.

108—59, 111; 211—2, 150; 248—98